United States Patent
Cooper et al.

(10) Patent No.: US 11,111,790 B2
(45) Date of Patent: Sep. 7, 2021

(54) METHOD OF UPGRADING A MODULAR GAS TURBINE ENGINE

(71) Applicant: ROLLS-ROYCE PLC, London (GB)

(72) Inventors: Joseph B Cooper, Bristol (GB); Katie Phillips, Derby (GB)

(73) Assignee: ROLLS-ROYCE plc, London (GB)

( * ) Notice: Subject to any disclaimer, the term of this patent is extended or adjusted under 35 U.S.C. 154(b) by 42 days.

(21) Appl. No.: 16/655,360

(22) Filed: Oct. 17, 2019

(65) Prior Publication Data

US 2020/0141239 A1  May 7, 2020

(30) Foreign Application Priority Data

Nov. 2, 2018 (GB) ..................... 1817936

(51) Int. Cl.
*F02K 3/06* (2006.01)
*F01D 5/00* (2006.01)

(52) U.S. Cl.
CPC ............. *F01D 5/005* (2013.01); *F02K 3/06* (2013.01); *F05D 2230/80* (2013.01)

(58) Field of Classification Search
CPC ........ F01D 5/005; F01D 5/286; F01D 25/285; F02K 3/06; F05D 2230/80; F05D 2230/61; F02C 7/20; F02C 9/28; B63H 21/16

See application file for complete search history.

(56) References Cited

U.S. PATENT DOCUMENTS

| 3,842,595 A * | 10/1974 | Smith ...................... F02C 7/20 60/804 |
| 5,224,341 A | 7/1993 | Munroe et al. |
| 5,267,397 A * | 12/1993 | Wilcox .................. B63H 21/16 29/889.1 |

(Continued)

FOREIGN PATENT DOCUMENTS

| EP | 1607612 A1 | 12/2005 |
| GB | 2219046 A | 11/1989 |

(Continued)

OTHER PUBLICATIONS

Mar. 25, 2020 Search Report issued in European Application No. 19203545.

(Continued)

*Primary Examiner* — Lee A Holly
(74) *Attorney, Agent, or Firm* — Oliff PLC

(57) ABSTRACT

A method of upgrading a modular gas turbine engine, which includes: a first fan module with a fan having plurality of fan blades; a first engine core module including an engine core and a gearbox providing drive to the fan; and a first fan case module with a fan case arranged to enclose the fan blades, the method including: disassembling the gas turbine engine, replacing one of the first fan module, first engine core module or first fan case module with a replacement fan module, a replacement engine core module or a replacement fan case module; and reassembling the gas turbine engine using the replacement module, which is compatible with the others of the first fan module, first engine core module or first fan case module; and the replacement module designed to different parameters to one of the first fan module, first engine core module or first fan case module.

13 Claims, 5 Drawing Sheets

(56) References Cited

U.S. PATENT DOCUMENTS

| | | | |
|---|---|---|---|
| 8,366,385 B2* | 2/2013 | Davis | F01D 25/285 |
| | | | 415/124.2 |
| 9,056,372 B2* | 6/2015 | Miglietti | F01D 5/286 |
| 2006/0112552 A1 | 6/2006 | Hanreich | |
| 2009/0081039 A1 | 3/2009 | McCune et al. | |
| 2014/0123625 A1* | 5/2014 | Snell | F02C 9/28 |
| | | | 60/204 |

FOREIGN PATENT DOCUMENTS

| | | |
|---|---|---|
| GB | 2238082 A | 5/1991 |
| WO | 01/61168 A1 | 8/2001 |

OTHER PUBLICATIONS

Apr. 30, 2019 Search Report issued in British Patent Application No. 1817936.6.

* cited by examiner

METHOD OF UPGRADING A MODULAR GAS TURBINE ENGINE

The present disclosure relates to a method of upgrading a modular gas turbine engine, and a system comprising a plurality of gas turbine engines.

Gas turbine aircraft engines comprise a propulsive fan arranged downstream of an air intake. The fan is surrounded by a fan case, and typically generates two separate airflows. A first airflow is received by a core of the engine, and a second airflow is received in a bypass duct. The core comprises one or more compressors, a combustor, and one or more turbines. The bypass duct is defined around the core.

In use, the core airflow is compressed by the compressors, mixed with fuel and combusted in the combustor. The combustion products are expanded through the turbine stages and exhausted through a core nozzle. The turbines drive the compressor stages and propulsive fan through one or more interconnecting shafts.

Typically, whilst some thrust is provided by the core nozzle, the majority of the thrust generated by the engine is provided by the propulsive fan, through the bypass duct. Propulsive efficiency of the gas turbine can be improved by increasing the bypass ratio (the ratio of the air mass flow through the bypass duct to the air mass flow through the core). The bypass ratio is related to the size of the fan which in turn is limited by the rotation speed of the fan, as a large fan rotating at high speed may experience unwanted distortion of the fan, and other effects.

If the fan is driven by a reduction gearbox, it can be driven at slower speeds than the shafts from the turbines. This enables the fan to be increased in size, facilitating an increase of the bypass duct ratio.

Generally, when an upgraded component is available for a gas turbine engine, the whole engine is taken out of use whilst the replacement part is fitted. Alternatively, if the upgrade is a significant part, a whole new engine is provided.

According to a first aspect, there is provided a method of upgrading a modular gas turbine engine, wherein the gas turbine engine comprises: a first fan module comprising a fan having plurality of fan blades; a first engine core module including an engine core and a gearbox arranged to provide drive to the fan; and a first fan case module comprising a fan case arranged to enclose the fan blades, the method including the steps of: disassembling the gas turbine engine, replacing a one of the first fan module, first engine core module or first fan case module with a replacement fan module, a replacement engine core module or a replacement fan case module; and reassembling the gas turbine engine using the replacement module, wherein the replacement module is compatible with the others of the first fan module, first engine core module or first fan case module; and wherein the replacement module is designed to different parameters to the one of the first fan module, first engine core module or first fan case module, such that it alters the performance of the engine.

The method provides a way to upgrade an engine to provide improved performance, without having to take the whole engine out of use. The method therefore ensures that engines, and aircraft to which the engines are secured, are not out of use for prolonged periods. This also allows for quick swapping of modules, and reduced development time through the re-use of the modules.

The one of the first modules may be releasably secured to the others of the first modules through one or more connection points at one or more connection positions. The replacement module may be releasably secured to the others of the first modules through the one or more connection points at the one or more connection positions.

The one of the first modules may include one or more apertures, openings or electrical connections coupled to the others of the first modules in first coupling positions. The replacement module may include the same one or more apertures, openings or electrical connections coupled to the others of the first modules in the first coupling positions.

The replacement module may be arranged to provide improved performance of the gas turbine engine after reassembly. The improved performance may include one or more of:
  resistance to wear and tear or fatigue of one or more components;
  maximum thrust output;
  engine efficiency;
  engine noise;
  engine weight;
  engine emissions.

Replacing the one of the first modules may comprise: replacing one or more component parts of a different fan module, engine core module or fan case module having the same design parameters as the one of the first modules, to form the replacement module.

The one of the first modules may comprise the fan module or the engine core module. The method may further comprise: passing off the reassembled engine or the replacement module, to determine a power setting parameter of the engine (10) or a power setting parameter or power rating of the replacement module (50', 52', 54') for use in controlling the engine, during operation. Passing off only the upgraded engine or module allows the engine to be operated accurately and efficiently, in use.

Disassembling the gas turbine engine may comprise: removing the first fan module from engine core; disengaging joints between the first engine core module and the first fan case module; and separating the engine core from the fan case in an axial direction.

The method may include replacing another of the fan module, engine core module or fan case module with a second replacement module, prior to reassembling, the second replacement module being designed to different parameters to the other of the first fan module, first engine core module or first fan case module, such that it alters the performance of the engine.

The gearbox may be a first gearbox. The method may further include: replacing the first gearbox in the engine core module with a replacement gearbox prior to reassembling, the replacement gearbox being designed to different parameters to the first gearbox.

The engine core module and fan module may be passed off separately. The method may further comprise: passing off the replacement module independently of the other of the first modules after reassembly of the engine. Passing off the fan and engine core separately ensures that components that are not replaced do not go through unnecessary procedures, and are not taken out of use unnecessarily.

According to a second aspect, there is provided a system comprising a plurality of gas turbine engines, the system having: a plurality of first engine core modules, each comprising: an engine core having a turbine, a compressor, a core shaft connecting the turbine to the compressor; and a gearbox that receives an input from the core shaft and outputs drive at a lower rotational speed than the core shaft; a plurality of first fan modules compatible with the engine core first modules, each first fan module comprising a fan arranged to receive drive from an engine core and having a plurality of fan blades; a plurality of first fan case modules compatible with the first engine core modules and the first fan modules, each first fan case module comprising a fan case arranged to surround a fan and at least partially defining a bypass duct around an engine core; and a plurality of replacement modules comprising replacements for a one of the first fan modules, the first engine core modules or the first fan case module, wherein the replacement modules are compatible with the others of the first fan modules, the first engine core modules or the first fan case modules; wherein each of the plurality of gas turbine engines comprises a first fan module from the plurality of first fan modules, a first engine core module from the plurality of first engine core modules and a first fan case module from the plurality of first fan case modules; and wherein the replacement modules are interchangeable with the one of the first fan modules, the first engine core modules or the first fan case module, such that it alters the performance of the engine.

The system provides a way to upgrade engines in a fleet, to provide improved performance, without having to take the engines out of use. This is because the first modules can be swapped out for the replacement modules. The system therefore ensures that engines, and aircraft to which the engines are secured, are not out of use for prolonged periods. This also allows for quick swapping of modules, and reduced development time through the re-use of the modules.

The one of the first modules may be releasably secured to the others of the first modules through one or more connection points at one or more connection positions. The replacement module may be releasably secured to the others of the first modules through the one or more connection points at the one or more connection positions.

The one of the first modules may include one or more apertures, openings or electrical connections coupled to the others of the first modules in first coupling positions. The replacement module may include the same one or more apertures, openings or electrical connections coupled to the others of the first modules in the first coupling positions.

The replacement module may be arranged to provide improved performance of the gas turbine engine after reassembly. The improved performance may include one or more of:
resistance to wear and tear or fatigue of one or more components;
maximum thrust output;
engine efficiency;
engine noise;
engine weight;
engine emissions.

The engine core module and fan module may be passed off separately. The method may further comprise: passing off the replacement module independently of the other of the first modules after reassembly of the engine. Passing off the fan and engine core separately ensures that components that are not replaced do not go through unnecessary procedures, and are not taken out of use unnecessarily.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$'s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 4A:
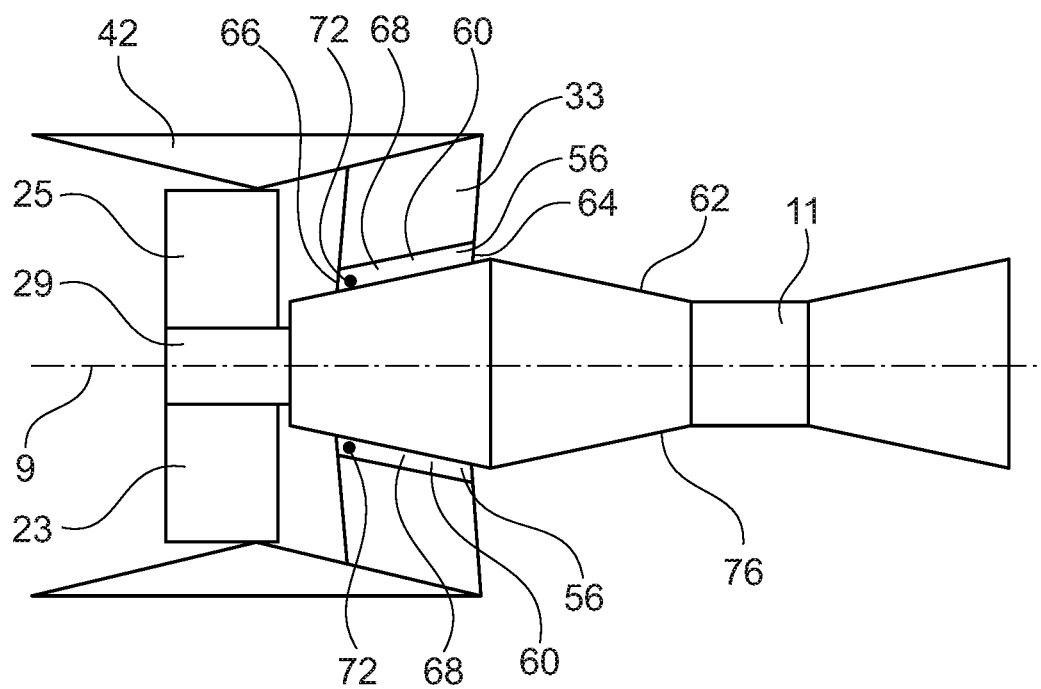
FIG. 4A illustrates a schematic view of the gas turbine engine of FIG. 1, illustrating the separate modules of the engine.
Figure 4B:
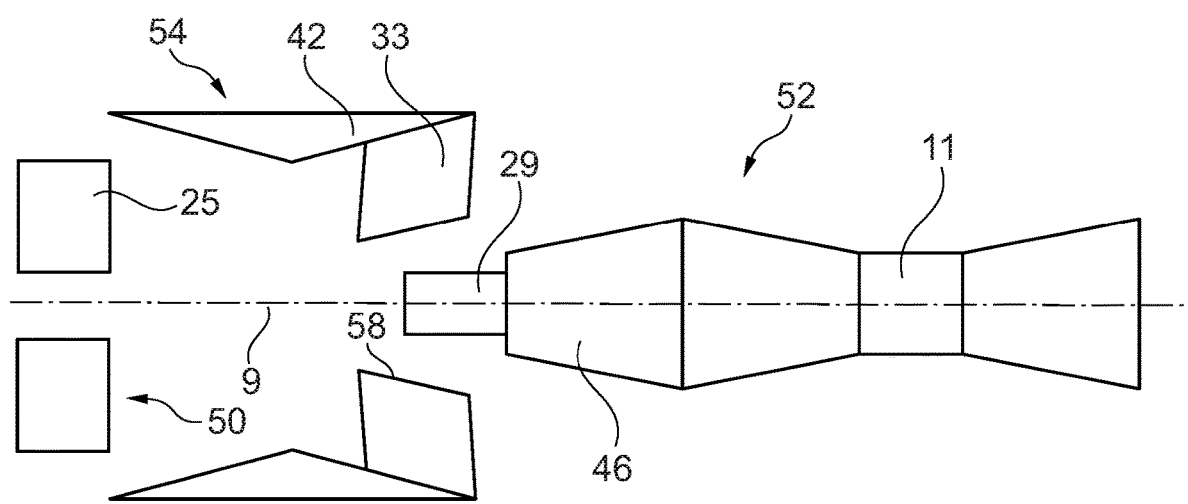
FIG. 4B illustrates the modules of FIG. 4A, in exploded form.
Figure 4C:
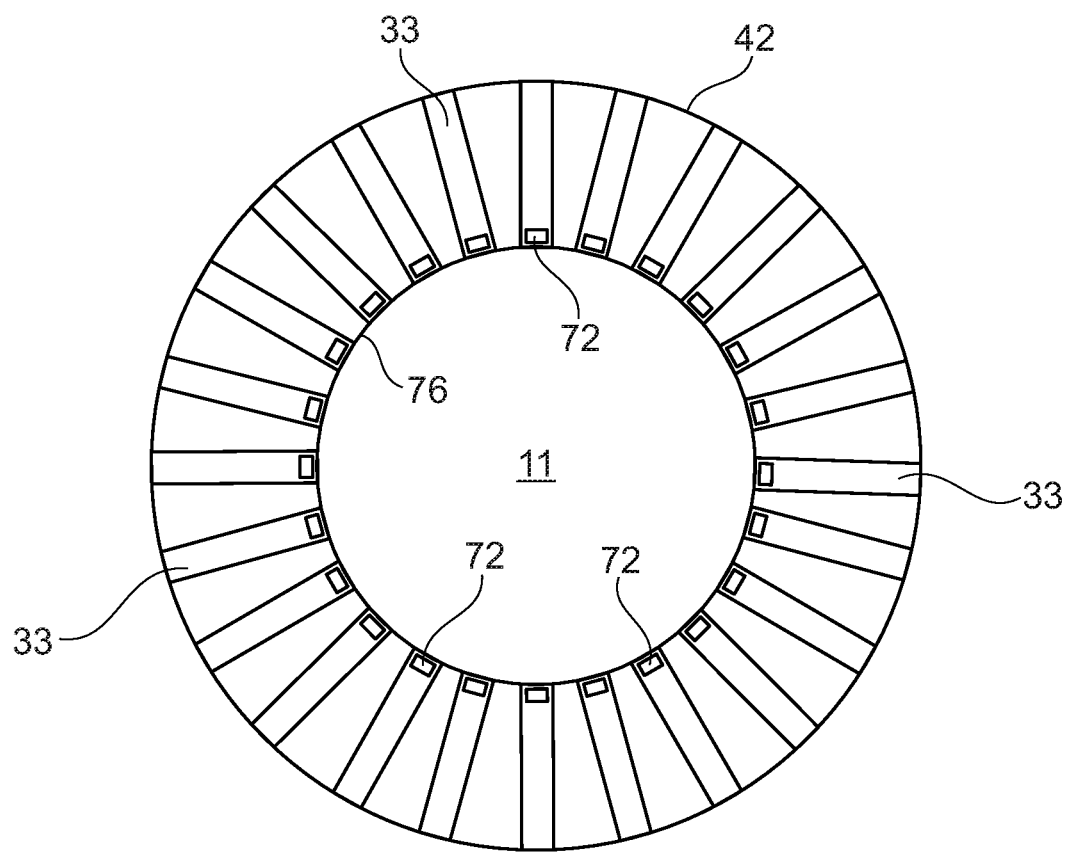
Figure 6:
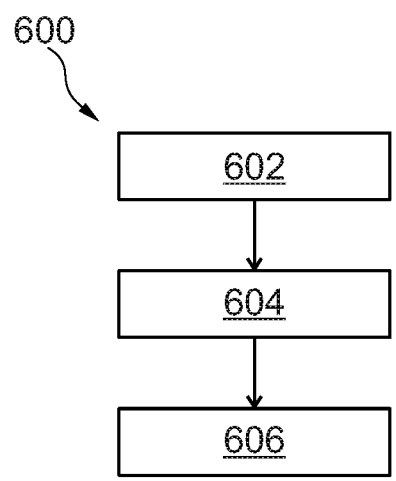
Figure 5:
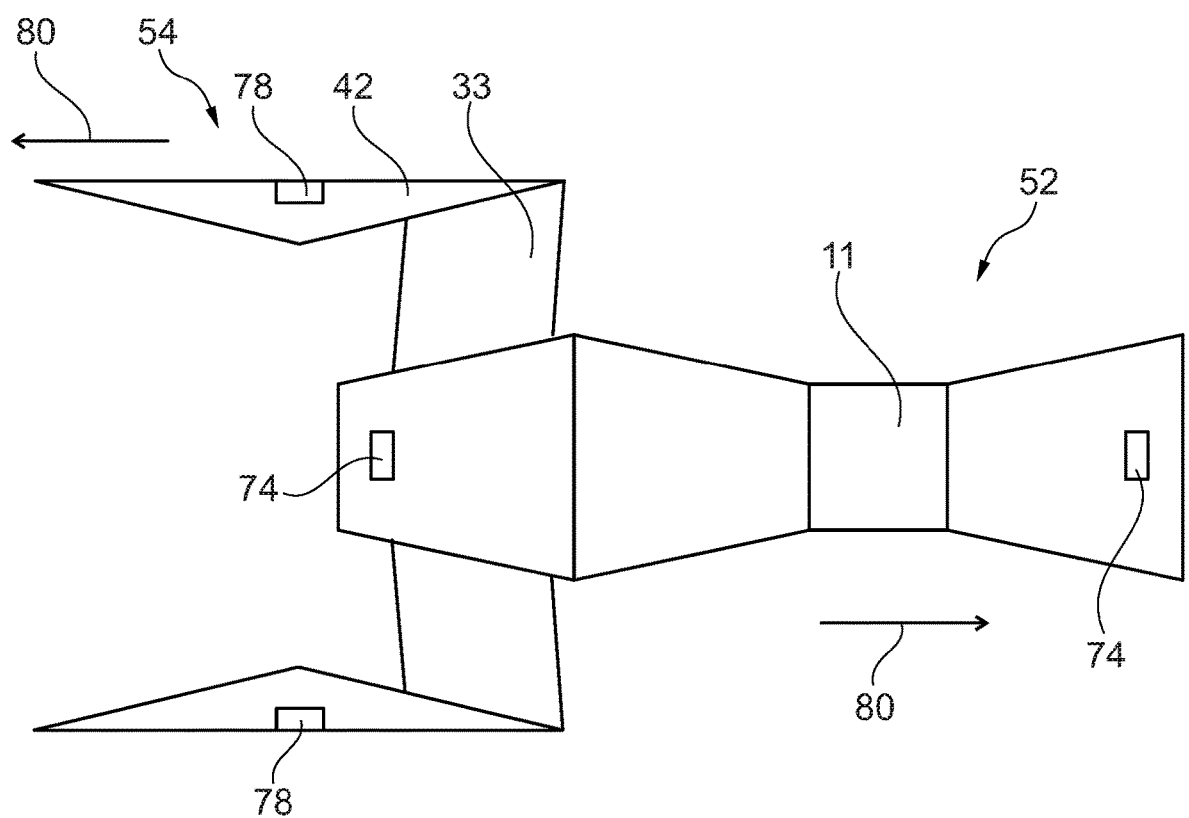

FIG. 4C schematically illustrates a cut-through view of the gas turbine engine of FIGS. 4A and 4B, from the front, in the region of the outlet guide vanes;

FIG. 5 schematically illustrates separation of an engine core module and a fan case module; and FIG. 6 illustrates a method for replacing a module of the gas turbine engine.

Figure 1:
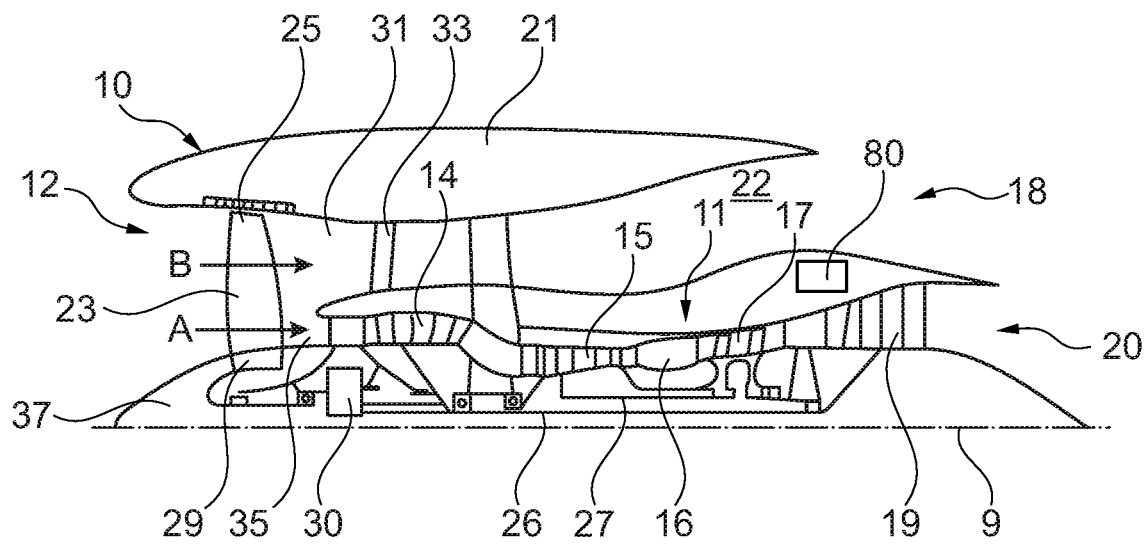
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. The fan 23 is attached to and driven by the low pressure turbine 19 via a shaft 26 and an epicyclic gearbox 30.

The propulsive fan 23 includes a plurality of fan blades 25 extending radially outward from a hub 29 mounted on an output shaft of the gearbox 30. The radially outer tips of the fan blades 25 are surrounded by a fan casing 42, which extends downstream behind the fan 23. Behind the fan casing 42, in the axial flow direction (downstream), a nacelle 21 surrounds the engine core 11. The fan casing 42 and nacelle 21 define a bypass duct 22 and a bypass exhaust nozzle 18 around the engine core 11.

The bypass airflow B flows through the bypass duct 22. At an upstream end of the bypass duct 22, adjacent an intake 31 of the bypass duct 22, and downstream of the fan 23, a plurality of outlet guide vanes 33 extend radially between the engine core 11 and the fan casing 42. The outlet guide vanes 33 reduce swirl and turbulence in the bypass airflow B, providing improved thrust.

In use, the core airflow A enters the core intake 35, and is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
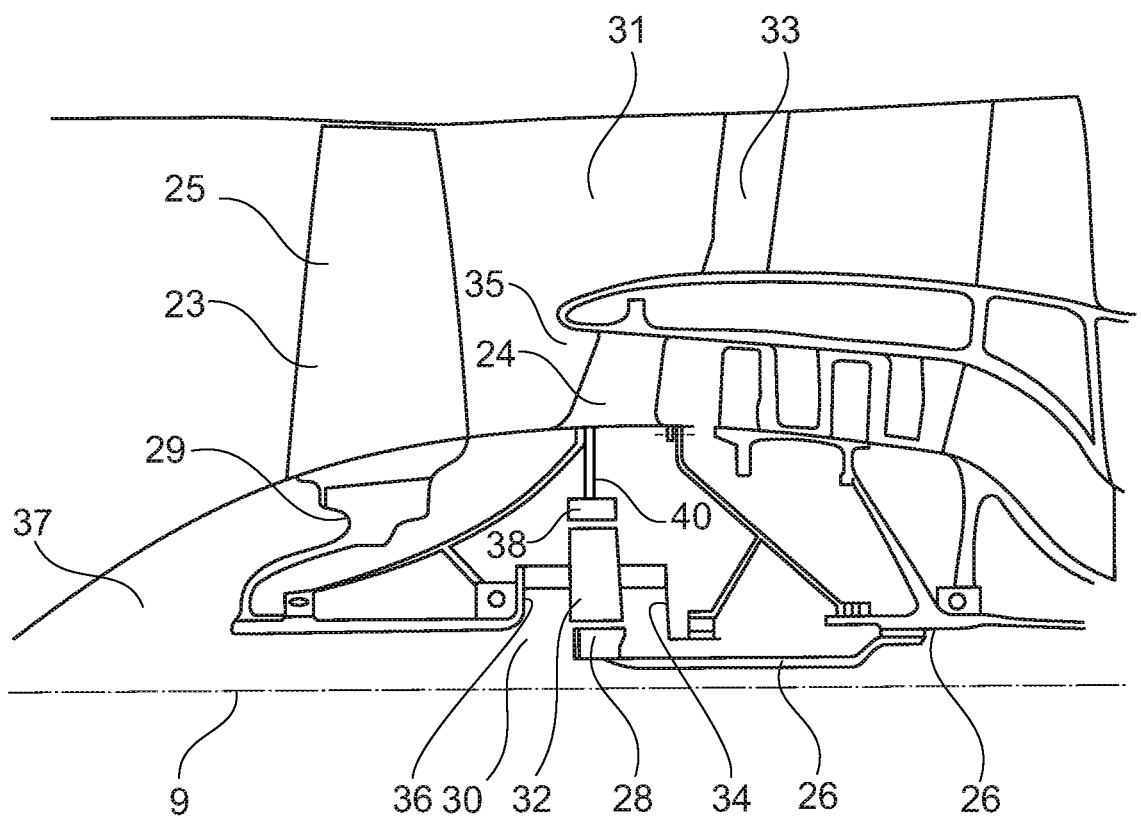
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
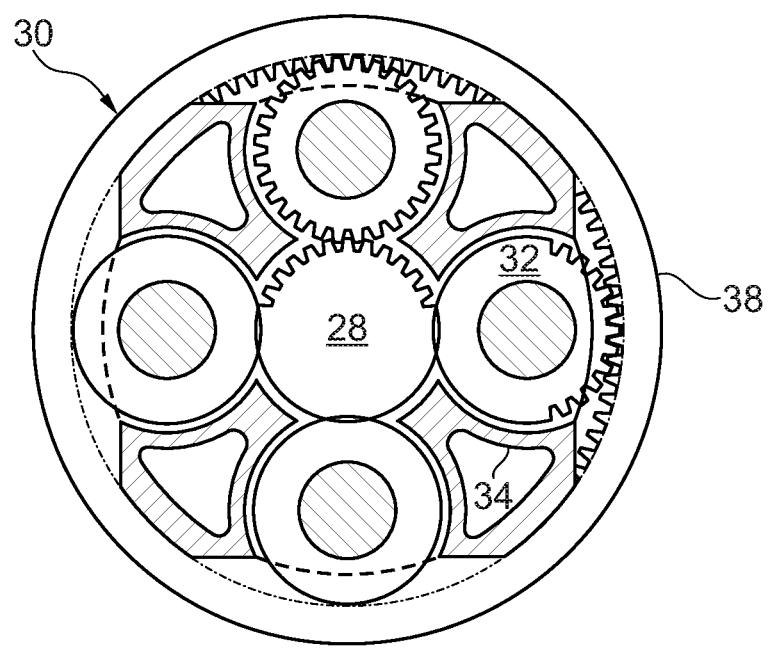
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. The gas turbine engine 10 may also be arranged in the "pusher" configuration, in which the fan 23 is located downstream of the core 11. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4A schematically illustrates the constituent components of the gas turbine engine 10 of FIGS. 1 to 3, with the nacelle 21 removed. As shown in FIG. 4B, the gas turbine engine 10 is formed of a number of separate modules 50, 52, 54. The engine 10 may thus be considered modular.

The first module is an engine core module 52. This typically includes the gearbox 30, low pressure compressor 14, high-pressure compressor 15, combustion equipment 16, high-pressure turbine 17, and low pressure turbine 19. The engine core module 52 can also be referred to as a propulsor.

The second module, also referred to as the fan module 50, includes the fan blades 25.

The third module is a fan case module 54. This includes the fan case 42, with the outlet guide vanes 33 extending inwardly from the fan case 42. The hub 29 and gearbox 30 may be part of the fan module 520 or the engine core module 52. The gearbox 30 may additionally be configured as a separable module in its own right or part of the fan case module 54.

In the assembled engine, the engine core module 52 is joined to the fan case module 54 by joints 56 formed at the radially inner ends 58 of the outlet guide vanes 33. Slots 60 are formed in the outer surface 62 of the engine core 11. The slots 60 have a closed end 64 facing downstream through the engine 10, and an open end 66 opposite the closed end 64.

A projection 68 is formed on the radially inner end 58 of each outlet guide vane 33. The projection 68 is arranged to co-operate with the slot 60 on the engine core 11. Once the projection 68 is received in the slot 60, a closing member 72, such as a bolt, may be used to close the open end 66 of the slot 60.

The closing member 72, and closed end 64 prevent relative axial movement of the fan case module 54 and the engine core module 52. In one example, the closing member 72 may pass through a corresponding opening (not shown) formed in the projection to further prevent relative movement of the two modules 52, 54. The slot 60 and projection 68 may optionally be shaped to prevent radial movement of the outlet guide vanes 33, and thus fan casing 42, relative to the engine core 11.

FIG. 4C schematically illustrates a sectional front view of the engine 10, facing the upstream end of the outlet guide vanes 33 of the engine. As can be seen in FIG. 4C, the closing members 72 are arranged around the inner circumference of the bypass duct 22. As shown in FIG. 4C, the joints 56 are thus formed around this circumference.

Further connecting/support struts (not shown) may also be provided between the fan case 42 and the engine core 11, if required.

The fan blades 25 of the fan module 50 may be secured to the output of the gearbox in any suitable manner. For example, the fan hub 29 and fan blades 25 may also have corresponding projections and slots (not shown) to fix the blades to the engine core 11. A nose cone 37 is also provided on the axially front end of the engine core 11, to retain the fan 23.

The fan case module 54 is secured to the nacelle 21 of the engine 10 through suitable fixings. The engine 10 is then secured to an aircraft (not shown) through struts extending from the nacelle 21.

As shown in FIG. 4B, the fan module 50 can be separated from the engine core module 52, and the engine core module 52 and fan case module 54 can be separated from one another. The separation of the modules 50, 52, 54 will now be discussed in more detail, with reference to FIG. 5.

As a first step of separating the modules 50, 52, 54, the fan module 50 is removed from the engine core module 52. Prior to the removal of the fan blades 25, it may be necessary to remove the nose cone 37. Once this is done, the fan blades may then be removed. FIG. 5 illustrates the engine 10 with the fan module 50 removed.

As discussed above, support struts (not shown) may also be provided between the fan case 42 and the engine core 11.

Where such struts are present, these are disconnected. This may be before or after removal of the fan module 50.

Following this, the joints 56 formed between the outlet guide vanes 33 and engine core 11 are disengaged by removing the closing members from the slots 60. These joints 56 provide the only structural link between the engine core module 52 and the fan case module 54. Therefore, prior to removal, a lifting tool may be brought into support the engine core module 52, such that when joints 56 are disengaged, the core 11 is still supported.

The engine core 11 includes a number of lifting points 74 (see FIG. 5) at which the lifting tool can engage the core 11. The lifting points 74 may be formed in the housing 76 of the core 11, and connected through to the support structure 24 of the engine 10.

As shown in FIG. 4C, the joints 56 are arranged around the inner circumference of the bypass duct 22. In one example, the joints may be disengaged in diametrically opposed pairs, until a single pair remains, to ensure that the load of the engine core 11 is always as evenly spread as possible.

Once all joints have been disconnected, the lifting tool is used to extract the engine core module 52 from the fan case module 54. The core is moved axially with respect to the principal axis 9' of the engine 10, in the direction away from the closed ends 64 of the slots 60, shown by the arrows 80.

It will be appreciated that there may be very little clearance between the engine core module 52 and fan case module 54. This means that the two modules 52, 54 need to be aligned to a high degree of accuracy in order to move the engine core module 52 out of the fan case module 54. Furthermore, as the joints 56 are disengaged, the engine core module 52 may shift vertically with respect to the fan module 54 as the load distribution of the engine core 11 changes. To accommodate this change, the lifting tool may vertically adjust the height of the engine core module 52 during the process of separating the modules.

The fan case module 54 may also be disconnected from the nacelle 21. A separate lifting tool may be provided for the fan case module 54. As with the engine core module 52, the fan case module 54 may include corresponding lifting points 78 formed in the fan case 42 and/or outlet guide vanes 33. The relative vertical movement between the fan case module 54 and engine core module 52 may be provided by either the fan case lifting tool on its own, the propulsor lifting tool on its own, or both in combination.

It will be appreciated that in some instances, the above process may be carried out with the engine 10 mounted on the wing of an aircraft. In alternative examples, the engine may be removed from the wing, and suspended in a support structure. The lifting tools for the engine core module 52 and/or fan case module 54 may be part of the support structure, or may be separate.

It will also be appreciated that the engine 10 may be assembled using the reverse of the above process.

The ability to separate the engine 10 into separate modules 50, 52, 54 facilitates easy delivery and transport of the engine 10. Furthermore, the fan case 42 is typically continuous around its circumferences. This means that the fan case module 54 is large and difficult to transport. However, the fan case module 54 requires significantly less service, repair and maintenance than the other modules 50, 52.

Therefore, the ability to remove the fan module 50 and the engine core module 52 means that these parts, which require more regular servicing but which are easier to transport, can be shipped for servicing without having to ship the fan case 42.

Gas turbine engines 10 typically include accessory drive units 82. These are arranged to take drive from the core shafts 26, 27 of the engine 10, and use it to power subsystems of the engine 10 and aircraft, such as cooling systems, cabin air systems and the like. In some examples of the gas turbine engine 10 discussed above, the accessory drive unit(s) 82 of the engine are provided within the engine core 11. Therefore, the accessory unit(s) 82 are part of the engine core module 52.

Using core mounted accessory unit(s) 82 ensures that no drive needs to be transmitted across the bypass duct 22. Furthermore, no cooling fluid or air for the accessory unit(s) 82 needs to be transmitted across the bypass duct 22 either. This simplifies the connection between the modules 50, 52, 54 since there is reduced connections between the different modules 50, 52, 54. In some examples, there may be no air or fluid connections across the bypass duct 22 at all. Optionally, electrical connections may be provided across the bypass duct 22, but in some examples there may not even be electrical connections.

Examples of core mounted accessory units may include units such as the oil tank, accessory gearbox and related systems, data entry plug, ignitors, oil heat management systems, and the associated pipes and cables.

The different modules 50, 52, 54 are interchangeable. This means that, for example, a particular fan module 50 and fan case module 54 may be used with any engine core module 52, where the engine core module 54 is made to the same configuration and design parameters.

Similarly, the engine core module 52 may be used with any fan module 50 and fan case module 54, and any compatible fan case module 54 may be used with any compatible fan module 50.

The interchangeability of modules 50, 52, 54 means that, for example, a first engine core module 52 may be swapped out for a different, second engine core module 52'. In order for two different engine core modules 52, 52' to be interchangeable, there should, if possible, be a number of common features between the modules 52, 52'.

In particular, the second engine core module 52' should, if possible, connect to the fan case module 54 and the fan module 50 by joints 56 that are the same as with the first engine core module 52. The configuration and positions of the joints 56 should be the same. Any other connection points, for example for struts and the like, should also be provided in the same place and style.

Furthermore, where there are other links between the modules 50, 52, 54, such as conduits for air or fluid, electrical connections, data connections or other connections, these links are also provided in the same locations on the first and second engine core modules 52, 52'.

Notwithstanding the above common features between the first and second engine core modules 52, 52', the second engine core module 52' is made to a different design to the first engine core module 52. As such, replacing the engine core module 52 can improve the engine performance. Thus, by replacing the engine core module 52, the whole engine 10 can be upgraded without having to take the aircraft fitted within the engine 10 out of service for a prolonged period, and without having to provide new fan and fan case modules 50, 54.

The improved performance may be in one or more of a number of different categories. For example, the improved performance may relate to: resistance to wear and tear or fatigue of one or more components; maximum thrust output; engine efficiency; engine noise; engine weight; and engine emissions.

The design of the second engine core module 52' may vary from the first engine core module 52 in a number of different ways. This may be in the materials used for some components, the size, shape or relative location of components, new schematic layouts, or any other design parameter of the engine 10.

FIG. 6 illustrates a method 600 in which one of the modules 50, 52, 54 in an engine 10, such as the engine core module 52, can be replaced and upgraded.

In a first step 602, the engine 10 is disassembled. This may include removing the fan module 50 from the engine core module 52, and removing the engine core 52 from the fan casing module 54, as discussed above.

In a second step 604, the engine core module 52 is switched with a different engine core module 52', compatible with the engine 10. In a third step 606, the engine 10 is reassembled using the original fan module 50 and fan case module 54, and the replacement engine core module 52'. In this way, the aircraft to which the engine 10 is fitted can be kept in use, whilst the engine core module 52 is serviced.

There are two contributions to the thrust generated by a gas turbine engine 10. The first is the core airflow B through the engine core 11, the second is the bypass airflow A, through the bypass duct 22. In flight, the thrust produced by a gas turbine aircraft engine 10 cannot be directly measured. In one method of operating a gas turbine engine 10, a power setting parameter is used to determine the thrust produced by the engine 10. The power setting parameter converts a measureable variable of the engine (such as shaft rotation speed) to the total thrust, to enable control of the engine 10.

The power setting parameter is established by a process known as passing off. In passing off, the engine 10 is calibrated in a test rig able to measure the thrust to determine the relationship between the thrust and the measureable variable.

Once the engine 10 is reassembled, according to the above method, the engine 10 can be passed off, to determine the new power setting parameter. Alternatively, the separate modules 50, 52, 54 of the engine can be passed off separately, to provide a separate power rating for each module 50, 52, 54. Therefore, where a module 50, 52, 54 is replaced, the reassembled engine 10 does not require passing off. Instead, the power setting parameter will combine the power ratings for the set of modules 50, 52, 54, 50', 52', 54' combined to form the engine 10, including any original modules 50, 52, 54 and any upgraded modules 50', 52', 54'.

In other examples, each module 50, 52, 54 may have a separate power setting parameter that enables the contribution of each module to the total thrust to be determined. Again, when a module 50, 52, 54 is replaced, these contributions can then be totalled to determine the total thrust generated by the engine 10, without having to pass off the whole engine.

In the examples where the engine does not require passing off as a completed unit when a module 50, 52, 54 is upgraded, only the new module 50', 52' needs passing off. The modules 50, 52, 54 that are not replaced are not passed off.

An operator of a fleet of aircraft or engines 10 may have a plurality of first engine core modules 52, a first plurality of fan modules 50 and a first plurality of fan case modules 54. The operator may also have a plurality of second engine core modules 52', and/or a second plurality of fan modules 50' and/or a second plurality of fan case modules 54'. An engine 10 can be upgraded by replacement of one of the first module 50, 52, 54 with one of the second modules 50', 52', 54'. Each engine 10 may initially include any one of each of the first engine core modules 52, any one of the first fan modules 50 and any one of the first fan case modules 54, rather than each engine 10 comprising dedicated sets of modules 50, 52, 54 that can only be used together. The interchangeability of modules 50, 52, 54 allows the engine core modules 52 (or other modules 50, 52) to be serviced, replaced, repaired or upgraded, whilst aircraft fitted the engines 10 remain functional. Otherwise, a replacement engine 10 would need to be transported to the aircraft, or the aircraft would have to be taken out of service for the engines 10 to be serviced.

The system may include more of the different modules 50, 52, 54, than engines 10. This ensures that aircraft can be kept in service whilst the modules undergo maintenance. In particular, but not exclusively, there may be more engine core modules 52 than engines 10, as this part requires the most regular maintenance.

It will be appreciated that the joints 56 between the outlet guide vanes 33 and the engine core 11 discussed above are just one example way of connecting the fan case module 54 to the engine core module 52. In some cases, the slots 60 may be open at both ends, with respective closing members 70, or the slot 60 may be open at either end.

The slot may be formed in the housing 76 of the engine core 11, with a through connection to the support structure 24 of the engine 10, or may be formed and coupled to the support structure 24 in any other way.

Any type of joint may be used between the outlet guide vanes 33 and the engine core 11, instead of the joint using slots 60 and projections 68. In one alternative example, the engine core 11 may include a pair of radial extending flanges (not shown) positioned at the upstream and downstream ends of the outlet guide vanes 33. The flanges are used to bolt the guide vanes 33 to the engine core 11. The flanges may be continuous around the outside of the engine core 11, or may be discontinuous. Where the flanges are discontinuous, sufficient flanges may be provided to couple all of the outlet guide vanes 33 to the engine core 11.

Furthermore, the provision of joints 56 at this particular location is given by way of example, only. The joints may be provided in any suitable location in the engine 10.

The method of separating the modules 50, 52, 54 discussed above is given by way of example only. Any suitable method may be used to separate the modules 50, 52, 54. Furthermore, any of the modules 50, 52, 54 may be upgraded, instead of the engine core module 52. In some cases, two of the modules 50, 52, 54 may be upgraded at the same time. In some examples, the gearbox 30 may be considered to be a further upgradeable module, in addition to the fan module 50, engine core module 52, and fan case module 54.

In some cases, the replacement modules 50', 52', 54' may be newly manufactured modules. However, it will be appreciated that in other cases, where an operator has a plurality of each of the modules 50, 52, 54, existing modules 50, 52, 54 from the plurality may be overhauled and modified to form the replacement modules 50', 52', 54'.

In some cases, the joints 56, links and connections on the replacement module 50', 52', 54' may be in different, but similar locations to the links on the first module 50, 52, 54, or of different format, or different in other ways. It will be appreciated that in some cases, the links and connections may be able to accommodate small differences. In other cases, adapters or converters may be provided to accommodate differences.

It will be appreciated that in some cases, the replacement module 50', 52', 54' may downgrade engine performance in some of the areas discussed above. For example, an engine core module 52 may be replaced with a module generating lower thrust where high levels of thrust are not needed, and operation of a high thrust engine would be inefficient.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of upgrading a modular gas turbine engine, wherein the gas turbine engine comprises: a first fan module comprising a fan having plurality of fan blades; a first engine core module including an engine core and a gearbox arranged to provide drive to the fan; and a first fan case module comprising a fan case arranged to enclose the fan blades, the method including the steps of:
   disassembling the gas turbine engine,
   replacing a one of the first fan module, first engine core module or first fan case module with a replacement fan module, a replacement engine core module or a replacement fan case module; and
   reassembling the gas turbine engine using the replacement module, wherein the replacement module is compatible with the others of the first fan module, first engine core module or first fan case module;
   wherein the replacement module is designed to different parameters to the one of the first fan module, first engine core module or first fan case module, such that the replacement module alters the performance of the engine, and
   wherein replacing the one of the first modules comprises replacing one or more component parts of a different fan module, engine core module or fan case module having the same design parameters as the one of the first modules, to form the replacement module.

2. The method of claim 1, wherein the replacement module is arranged to provide improved performance of the gas turbine engine after reassembly.

3. The method of claim 2, wherein the improved performance may include one or more of:
   resistance to wear and tear or fatigue of one or more components;
   maximum thrust output;
   engine efficiency;
   engine noise;
   engine weight;
   engine emissions.

4. The method of claim 1, wherein:
   the one of the first modules is releasably secured to the others of the first modules through one or more connection points at one or more connection positions; and
   the replacement module is releasably secured to the others of the first modules through the one or more connection points at the one or more connection positions.

5. The method of claim 1, wherein:
   the one of the first modules includes one or more apertures, openings or electrical connections coupled to the others of the first modules in first coupling positions; and
   the replacement module includes the same one or more apertures, openings or electrical connections coupled to the others of the first modules in the first coupling positions.

6. The method of claim 1, wherein the one of the first modules comprises the fan module or the engine core module, the method further comprising:
  passing off the reassembled engine or the replacement module, to determine a power setting parameter of the engine or a power setting parameter or power rating of the replacement module for use in controlling the engine, during operation.

7. The method of claim 1, wherein disassembling the gas turbine engine comprises:
  removing the first fan module from engine core;
  disengaging joints between the first engine core module and the first fan case module; and
  separating the engine core from the fan case in an axial direction.

8. The method of claim 1, including replacing another of the fan module, engine core module or fan case module with a second replacement module, prior to reassembling, the second replacement module being designed to different parameters to the other of the first fan module, first engine core module or first fan case module, such that the second replacement module alters the performance of the engine.

9. The method of claim 1, wherein the gearbox is a first gearbox, the method further including:
  replacing the first gearbox in the engine core module with a replacement gearbox prior to reassembling, the replacement gearbox being designed to different parameters to the first gearbox.

10. The method of claim 1, wherein:
  the turbine is a first turbine, the compressor is a first compressor, and the core shaft is a first core shaft;
  the engine core further comprises a second turbine, a second compressor, and a second core shaft connecting the second turbine to the second compressor; and
  the second turbine, second compressor, and second core shaft are arranged to rotate at a higher rotational speed than the first core shaft.

11. The method of claim 1, wherein the engine core module and fan module are passed off separately, and wherein the method further comprises:
  passing off the replacement module independently of the other of the first modules after reassembly of the engine.

12. A method of upgrading a modular gas turbine engine, wherein the gas turbine engine comprises: a first fan module comprising a fan having plurality of fan blades; a first engine core module including an engine core and a first gearbox arranged to provide drive to the fan; and a first fan case module comprising a fan case arranged to enclose the fan blades, the method including the steps of:
  disassembling the gas turbine engine,
  replacing a one of the first fan module, first engine core module or first fan case module with a replacement fan module, a replacement engine core module or a replacement fan case module; and
  reassembling the gas turbine engine using the replacement module, wherein the replacement module is compatible with the others of the first fan module, first engine core module or first fan case module, the replacement module is designed to different parameters to the one of the first fan module, first engine core module or first fan case module, such that the replacement module alters the performance of the engine; and
  replacing the first gearbox in the engine core module with a replacement gearbox prior to reassembling, the replacement gearbox being designed to different parameters to the first gearbox.

13. A method of upgrading a modular gas turbine engine, wherein the gas turbine engine comprises: a first fan module comprising a fan having plurality of fan blades; a first engine core module including an engine core and a gearbox arranged to provide drive to the fan; and a first fan case module comprising a fan case arranged to enclose the fan blades, the method including the steps of:
  disassembling the gas turbine engine,
  replacing a one of the first fan module, first engine core module or first fan case module with a replacement fan module, a replacement engine core module or a replacement fan case module; and
  reassembling the gas turbine engine using the replacement module, wherein the replacement module is compatible with the others of the first fan module, first engine core module or first fan case module, the replacement module is designed to different parameters to the one of the first fan module, first engine core module or first fan case module, such that the replacement module alters the performance of the engine, and the engine core module and fan module are passed off separately; and
  passing off the replacement module independently of the other of the first modules after reassembly of the engine.

* * * * *